US010348589B2

(12) United States Patent
Fedorov et al.

(10) Patent No.: US 10,348,589 B2
(45) Date of Patent: Jul. 9, 2019

(54) MANAGING NETWORKS AND MACHINES THAT DELIVER DIGITAL CONTENT

(71) Applicant: Netflix, Inc., Los Gatos, CA (US)

(72) Inventors: Sergey Fedorov, San Jose, CA (US); Stefan Praszalowicz, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 314 days.

(21) Appl. No.: 15/043,429

(22) Filed: Feb. 12, 2016

(65) Prior Publication Data

US 2016/0366038 A1 Dec. 15, 2016

Related U.S. Application Data

(60) Provisional application No. 62/180,023, filed on Jun. 15, 2015.

(51) Int. Cl.
*H04L 29/06* (2006.01)
*H04L 12/26* (2006.01)
(Continued)

(52) U.S. Cl.
CPC .......... *H04L 43/08* (2013.01); *H04L 41/0893* (2013.01); *H04L 41/142* (2013.01); *H04L 41/5025* (2013.01); *H04L 43/0817* (2013.01); *H04L 67/101* (2013.01); *H04L 67/42* (2013.01); *H04L 41/509* (2013.01)

(58) Field of Classification Search
CPC .................................................. H04L 67/142
See application file for complete search history.

(56) References Cited

U.S. PATENT DOCUMENTS 6,968,291 B1 * 11/2005 Desai .................. G06F 11/3006
370/254
6,970,432 B1 * 11/2005 Hankins .................. H04L 41/12
370/254
(Continued)

OTHER PUBLICATIONS

"This Box Can Hold an Entire Nethix", Gizmodo, http://gizmodo.com/this-box-can-hold-an-entire-netflix-1592590450.
(Continued)

*Primary Examiner* — Jimmy H Tran
(74) *Attorney, Agent, or Firm* — Artegis Law Group, LLP (57) ABSTRACT

In one embodiment of the present invention, a content delivery network (CDN) monitoring system manages a CDN. The CDN monitoring system includes finite state machines (FSMs), and the current states of the FSMs reflect characteristics and/or behaviors associated with the CDN. In operation, the CDN monitoring system computes actions based on current states and/or metrics associated with the CDN. The actions may cause one or more of the FSMs execute state transitions. As part of a state transition, the current state of the FSM changes and an event is generated. The event triggers an event handler that may perform any type of management operations, such as generating performance reports and rerouting client requests. Notably, because each current state may be an aggregation of other current states, the CDN monitoring system may be configured to compute current states that accurately represent complex interactions between components within the CDN.

20 Claims, 5 Drawing Sheets

(51) Int. Cl.
*H04L 12/24* (2006.01)
*H04L 29/08* (2006.01)

(56) References Cited

U.S. PATENT DOCUMENTS

| | | | | |
|---|---|---|---|---|
| 7,580,369 | B2* | 8/2009 | Hankins | H04L 41/12 370/254 |
| 7,890,692 | B2* | 2/2011 | Pandya | C11D 9/26 711/103 |
| 8,005,931 | B2* | 8/2011 | Naoi | G06F 8/38 709/222 |
| 8,447,842 | B2* | 5/2013 | Lisiecki | H04L 67/1095 709/219 |
| 8,868,834 | B2* | 10/2014 | Lientz | H04L 67/06 711/124 |
| 8,891,522 | B2* | 11/2014 | Fletcher | H04J 3/1617 370/238 |
| 9,015,416 | B2* | 4/2015 | Lientz | H04L 67/06 711/124 |
| 9,250,882 | B2* | 2/2016 | Piunno | G06F 8/54 |
| 9,596,306 | B2* | 3/2017 | Morrison, III | H04L 67/1063 |
| 9,641,402 | B2* | 5/2017 | Newton | H04L 41/0893 |
| 9,749,191 | B2* | 8/2017 | Varney | H04L 41/0893 |
| 2003/0046396 | A1* | 3/2003 | Richter | G06F 9/505 709/226 |
| 2003/0204273 | A1* | 10/2003 | Dinker | H04L 41/12 700/48 |
| 2006/0007911 | A1* | 1/2006 | Hankins | H04L 41/12 370/351 |
| 2009/0187647 | A1* | 7/2009 | Naoi | G06F 8/38 709/222 |
| 2011/0219108 | A1* | 9/2011 | Lisiecki | H04L 67/1095 709/223 |
| 2011/0276679 | A1 | 11/2011 | Newton et al. | |
| 2012/0151272 | A1* | 6/2012 | Behrendt | G06F 9/542 714/39 |
| 2012/0209968 | A1* | 8/2012 | Lawson | G06F 9/5072 709/220 |
| 2012/0215938 | A1* | 8/2012 | Fletcher | H04J 3/1617 709/238 |
| 2013/0132553 | A1 | 5/2013 | Stratton et al. | |
| 2014/0095804 | A1* | 4/2014 | Lientz | H04L 67/06 711/144 |
| 2014/0172971 | A1 | 6/2014 | Akkurt et al. | |
| 2014/0173054 | A1* | 6/2014 | Varney | H04L 41/0893 709/219 |
| 2014/0173066 | A1* | 6/2014 | Newton | H04L 41/0893 709/221 |
| 2014/0330924 | A1* | 11/2014 | Lientz | H04L 67/06 709/213 |
| 2015/0074187 | A1* | 3/2015 | Fletcher | H04J 3/1617 709/203 |
| 2015/0095917 | A1* | 4/2015 | Challenger | G06F 9/4843 718/104 |
| 2015/0207695 | A1* | 7/2015 | Varney | H04L 41/0893 709/223 |
| 2016/0134704 | A1* | 5/2016 | Morrison, III | H04L 67/1063 709/212 |
| 2016/0277316 | A1* | 9/2016 | Arigaya | G06F 9/5061 |

OTHER PUBLICATIONS

International Search Report having Application No. PCT/US2016/032782, dated Jul. 28, 2016, 12 pages.

* cited by examiner

MANAGING NETWORKS AND MACHINES THAT DELIVER DIGITAL CONTENT

CROSS-REFERENCE TO RELATED APPLICATIONS

This application claims benefit of the U.S. Provisional Patent Application having Ser. No. 62/180,023 and filed on Jun. 15, 2015. The subject matter of this related application is hereby incorporated herein by reference.

BACKGROUND OF THE INVENTION

Field of the Invention

Embodiments of the present invention relate generally to content delivery networks and distribution and, more specifically, to managing networks and machines that deliver digital content.

Description of the Related Art

Oftentimes, content delivery networks (CDNs) store multiple copies of digital content for vendors in clusters of severs that are located in different geographic regions. The servers within a server cluster are typically interconnected computers or virtual machines, where each computer or virtual machine manages a storage device and supplies services via a client-server architecture. Generally, in client-server architectures, clients request services and, in response, servers provide services. More specifically, when a client submits a request to access content stored within the CDN, a control server selects a server cluster and directs the request to the selected server cluster for processing. The control server may implement any number and types of routing algorithms and techniques to select the server cluster. For example, to optimize the overall performance of the CDN, some control servers implement server-load balancing techniques, internet service provider (ISP) caching, and so forth. In general, the control server may be configured to optimize any number and type of criteria, such as geographic proximity to the client, cost, etc.

To further optimize the performance of a CDN, ensure availability of the content stored in the CDN, and provide an acceptable overall quality of experience to the clients, many CDN providers track CDN metrics that measure the performance of various components included in the CDN. Such CDN metrics typically include server response time metrics for each server included in the CDN as well as network performance metrics (e.g., latency, packet loss, etc.) for each ISP network included in the CDN. Because a CDN usually includes large numbers of servers deployed in numerous geographical locations that operate on a variety of ISP networks, the number of metrics involved in monitoring CDN performance precludes effective manual analysis of such metrics. Consequently, many CDN providers rely on CDN management software to monitor and analyze the CDN metrics in an attempt to identify any malfunctions that may negatively impact the CDN.

One drawback to relying on conventional CDN management software is that the arrangement and interconnection of the components included in CDNs may be complicated. Consequently, conventional CDN management software may not effectively interpret the CDN metrics with respect to the overall configuration of the CDN. For example, suppose that a CDN includes 2000 servers organized into 40 server clusters, where each server cluster include 50 servers. Further, suppose that, in each of 39 "ok" server clusters, one server malfunctions, and, in the final "degraded" server cluster, 45 of the servers malfunction. In such a scenario, the CDN management software may analyze the server metrics and individually identify the 84 malfunctioning servers, but may fail to identify the degraded server cluster. Consequently, the CDN may continue to route requests to the degraded server cluster, and the time required for the CDN to response to such requests may become unacceptable long and/or the requests may fail. Accordingly, the availability of the content stored in the CDN and/or the overall quality of experience provided to clients may be negatively impacted.

As the foregoing illustrates, what is needed in the art are more effective techniques for managing the operation of machines and networks that deliver digital content.

SUMMARY OF THE INVENTION

One embodiment of the present invention sets forth a computer-implemented method for managing the operation of a content delivery network (CDN). The method includes computing a first action based on a first state that is associated with a first finite state machine (FSM) and corresponds to a first metric associated with a content delivery network (CDN); executing a first state transition between a second state and a third state based on the first action, wherein the second state and the third state are associated with a second FSM; and in response to the first state transition, executing a first event handling operation.

One advantage of the disclosed techniques is that a CDN monitoring subsystem may accurately and efficiently identify malfunctions that involve complex interactions between components included in the CDN. In particular, by configuring the CDN monitoring subsystems to include states that reflect aggregations of other states, the CDN monitoring subsystem may mimic a hierarchical deployment of components. Such a hierarchy of states enables the CDN monitoring subsystem to interpret the operation of the CDN in a holistic manner. Based on this accurate interpretation of the operation of the CDN, the operations of the components included in the CDN may be adjusted to ensure availability of content stored in the CDN and optimize the overall quality of experience provided to clients.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
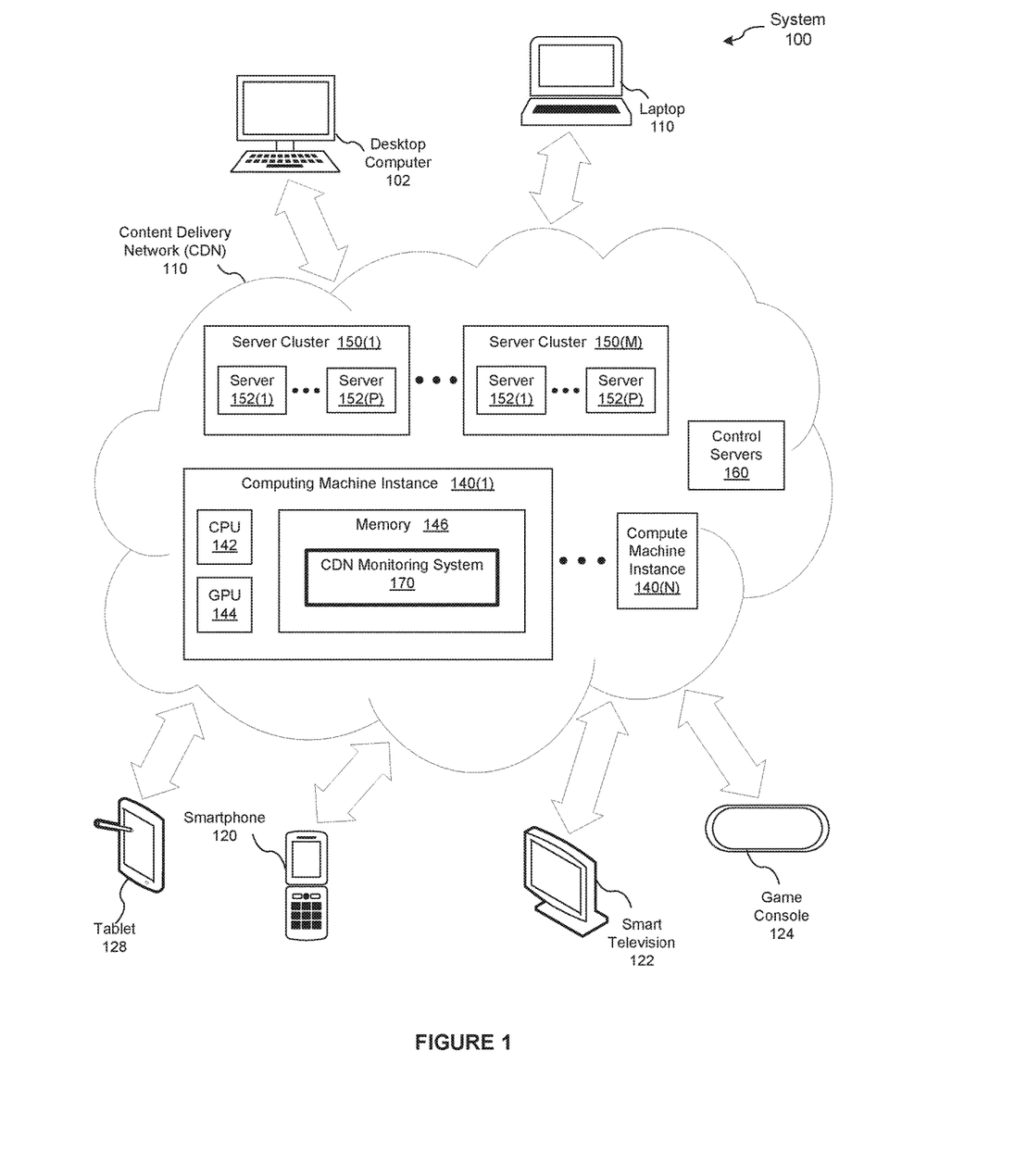
FIG. 1 is a conceptual illustration of a system configured to implement one or more aspects of the present invention.

FIG. 1 is a conceptual illustration of a system 100 configured to implement one or more aspects of the present invention. As shown, the system 100 includes a content delivery network (CDN) 110 connected to a variety of client machines. The client machines may include any machine capable of interacting with the CDN 110 in order to request and receive a content asset stored within the CDN 110. Example of client machines include, without limitation, a desktop computer 102, a laptop 110, a smartphone 120, a smart television 122, a game console 124, a tablet 128, television-connected devices (not shown), handheld devices (not shown), and streaming entertainment devices (not shown).

The client machines may interact with the CDN 110 using any type of communication paths and any protocols as known in the art. For example, in some embodiments, a broadband internet service provider (ISP) network (not shown) includes one or more machines and is responsible for managing internet traffic in a geographic region that either is proximate to the geographic location of one or more client machines or includes the geographic location of client machines. In such embodiments, the client machines may communicate with the CDN 110 via the broadband ISP network.

The CDN 110 may include any number of computing machine instances 140 configured with any number (including zero) of central processing units (CPUs) 142, graphics processing units (GPUs) 144, memory 146, etc. In operation, the CPU 142 is the master processor of the computing machine instance 140, controlling and coordinating operations of other components included in the computing machine instance 140. In particular, the CPU 142 issues commands that control the operation of the GPU 144. The GPU 144 incorporates circuitry optimized for graphics and video processing, including, for example, video output circuitry. In various embodiments, GPU 144 may be integrated with one or more of other elements of the computing machine instance 140. The memory 146 stores content, such as software applications and videos, for use by the CPU 142 and the GPU 144 of the compute instance 140.

In alternate embodiments, any number of the computing machine instances 140 may be replaced with any instruction execution system, apparatus, or device capable of executing software applications. In some embodiments, the memory 146 may be replaced with any storage device capable of storing software applications, such as a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing Any number of the computing machine instances 140 included in the CDN 110 are configured as control servers 160. The control servers 160, among other things, are responsible for managing the delivery of one or more content assets to client machines in response to one or more requests for such content assets from the client machines. Upon receiving a request for a content asset, the control server 160 selects a server cluster 150 that includes a server 152 that stores the content asset and then routes the request to the selected server cluster 150. As a general matter, the control servers 160 may implement any distributed data store techniques as known in the art for storing content assets across the servers 152 and, subsequently, accessing the stored content assets.

Any number of the computing machine instances 140 included in the CDN 110 are configured as the servers 152. Each of the servers 152 manages any number (including zero) of storage devices, also referred to herein as a "disk," that store content assets. As persons skilled in the art will recognize, the memory required to store all content assets may exceed the memory included in the storage devices managed by a single server 152. Further, the network hardware associated with a single server 152 may not be capable of handling the traffic with all potential clients. To address these storage and traffic limitations, the servers 152 may be organized into any number of the server clusters 150.

Collectively, the resources (storage devices, network hardware, etc.) associated with the servers 152 included in a given server cluster 150 are capable of storing all the content assets and handling the traffic with all potential clients. Further, the server cluster 150 is configured to provide redundancy that increases the tolerance of the server cluster 150 to malfunctions associated with individual servers 152. More specifically, if some of the servers 152 included in the server cluster 150 malfunction, then the server cluster 150 may continue to operate acceptably. To provide additional redundancy and tolerance to malfunctions, each content asset is typically stored in multiple storage devices that are managed by different servers 152 included in different server clusters 150. As a general matter, the storage processes implemented in the CDN 110 typically ensure availability of the content assets irrespective of the individual availability of each of the servers 152 and the server clusters 150.

Upon receiving a client request for content assets, the control server 160 may implement any number and types of routing algorithms and techniques to select a particular server cluster 150 and then route the client request to the selected server cluster 150. For example, to optimize the overall quality of experience for clients, some control servers implement server-load balancing techniques, internet service provider (ISP) caching, and so forth. In general, the control server 150 may be configured to optimize any number and type of criteria, such as geographic proximity to the client, cost, etc.

To further optimize the performance of a conventional CDN and assure that the CDN responds adequately to client requests, many CDN providers rely on CDN management software. The CDN management software monitors CDN metrics that reflect the performance of various components included in the CDN. Such CDN metrics typically include server response time metrics for each of the servers included in the CDN as well as network performance metrics (e.g., latency, packet loss, etc.) for each ISP network included in the CDN. Based on the CDN metrics, the CDN management software and/or the CDN provider attempt to identify and optionally mitigate any malfunctions that may negative impact the performance of the CDN, jeopardize the availability of the content assets, and/or reduce the overall quality of experience provided to clients.

However, conventional CDN management software analyzes the performance of individual components of the CDN in isolation. Consequently, conventional CDN management software may not effectively identify and/or mitigate malfunctions that involve multiple components of the CDN. For explanatory purposes, multiple instances of like objects are denoted with reference numbers identifying the object and parenthetical numbers identifying the instance where needed. Further, a range of "X" like objects are denoted with a parenthetical range (i.e., (0:X−1)).

For example, suppose that the CDN 110 includes the forty server clusters 150(1:40) and each of the server clusters 150(1:40) includes fifty of the servers 152. Further, suppose that in each of the thirty-nine server clusters 150(1:39), one of the servers 154 malfunctions, and in the server cluster 150(40), forty-five of the servers 152 malfunction. In such a scenario, the CDN management software may analyze the server metrics, determine that eighty-four of the servers 152 have malfunctioned and, in response, configure a graphical user interface to display a warning. However, the CDN management software may fail to identify the "degraded" server cluster 150(40), and the control servers 160 may continue to route requests to the server cluster 150(40). Consequently, the time required for the CDN 110 to respond to requests that are routed to the server cluster 150(40) may become unacceptably long and/or the requests may fail.

Content Delivery Network (CDN) Monitoring System

To enable more effective analysis and/or modification of the operation of the CDN 110 than is provided by conventional CDN management software, one or more of the compute machine instances 140 implements a CDN monitoring subsystem 170. The CDN monitoring subsystem 170 is stored in the memory 146 and executes on the CPU 142. In alternate embodiments, the functionality included in the CDN monitoring subsystem 170 may be distributed across any number of computing machine instances 140. In some alternate embodiments, the CDN monitoring subsystem 170 may be implemented as a stand-alone software application that is not included in the CDN 110. In other alternate embodiments, functionality of the CDN monitoring subsystem 170 may be distributed between any number of software application, and each software application may or may nor be included in the CDN 110. In general, the CDN monitoring subsystem 170 or any number of software applications that implement the functionality of the CDN monitoring subsystem 170 that is described herein may be stored in any storage device and may execute on any instruction execution system, apparatus, or device capable of executing software applications.

In operation, the CDN monitoring subsystem 170 implements a multi-stage analysis process that computes current states associated with the CDN 110 at any given point in time. As a general matter, each of the current states reflects some operational status of the CDN 110. The CDN monitoring subsystem 170 may be configured to implement any number of current states and compute each current state in any technically feasible fashion. In particular, the CDN monitoring subsystem 170 may be configured to compute each current state based on system data (e.g., CDN metrics, configuration data, etc.), other current states, or any combination thereof. Because the CDN monitoring subsystem 170 may combine current states to generate aggregated current states, the CDN monitoring subsystem 170 may compute and analyze operational statuses that reflect relationships and interactions between various components associated with the CDN 110.

For example, in some embodiments, the CDN monitoring subsystem 170 may be configured to compute current states that reflect the overall health of the servers 152 based on server response time metrics. Further, for each of the server clusters 150, the CDN monitoring subsystem 170 may be configured to compute a current state that reflects the overall health of the server cluster 150 based on the current states of the servers 152 included in the server cluster 150. In this fashion, the CDN monitoring subsystem 170 may be configured to analyze and respond to current states that reflect complex interactions between components included in the CDN 110 at varying granularities.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. For example, the techniques described herein may be applied to monitor and/or manage any set of objects that are interconnected in any fashion via any number of communication paths and are configured to perform any type of content delivery services.

Figure 2:
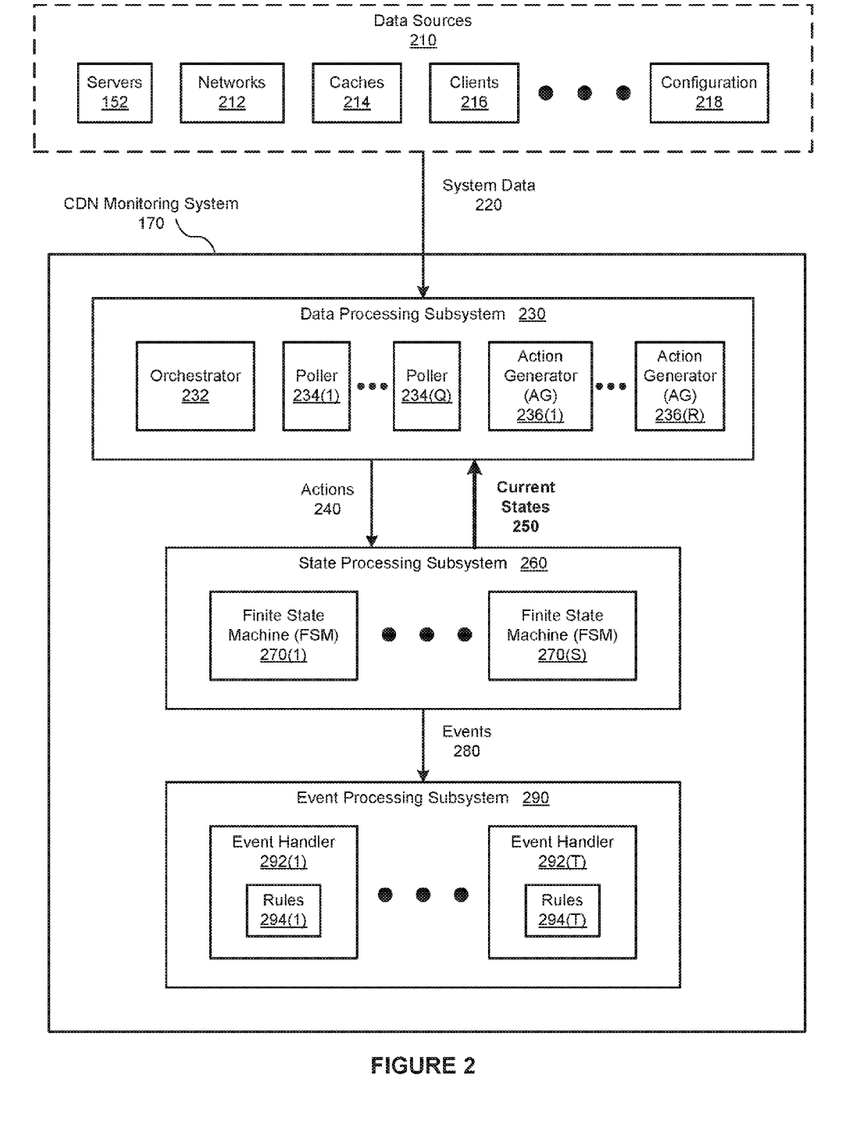
FIG. 2 is a more detailed illustration of the content delivery network (CDN) monitoring system of FIG. 1, according to various embodiments of the present invention.

FIG. 2 is a more detailed illustration of the content delivery network (CDN) monitoring system 170 of FIG. 1, according to various embodiments of the present invention. As shown, the CDN monitoring system 170 includes, without limitation, a data processing subsystem 230, a state processing subsystem 260, and an event processing subsystem 290. In alternate embodiments, the CDN monitoring system 170 may include any number of subsytems and the functionality described herein may be distributed in any manner between the subsystems.

In general, to enable the CDN monitoring system 170 to interpret the operation of the components associated with the CDN 110 in a contextually-relevant manner, the data processing subsystem 260 and the state processing subsystem 270 implement a bi-directional connection. More specifically the state processing subsystem 230 computes actions 240 based on system data 220 and current states 250, and the state processing subsystem 270 computes "new" current states 250 based on the actions 240 and the current states 250. Because the state processing subsystem 270 feedbacks the current states 250 to the data processing subsystem 260, the data processing subsystem 260 may aggregate any number of the current states 250 to compute actions that effect any number of other current states 250.

The CDN monitoring subsystem 170 may be configured to include any number of the current states 250, and each of the current states 250 may be configured to monitor the operation of the CDN 110 in any technically feasible fashion. Further, as part of an initialization process, the CDN monitoring subsystem 170 may set the current states 250 to initial states. For example, system engineers may select and define the current states 250 to mirror the deployment of the server clusters 150, the servers 152, and networks 212 associated with the CDN 170. The system engineers may then select the initial states based on a configuration 218 associated with the CDN 110.

As shown, the data processing subsystem 230 receives system data 220 from data sources 210. The system data 220 and the data sources 210 may include any number and type of objects that may influence the performance of the CDN 110. For example, the system data 220 may include CDN metrics such as CPU metrics, disk metrics, ISP network performance metrics, and the like. The data sources 210 may include, without limitation, the servers 152, the networks 212, caches 214, clients 216, and a configuration 218 associated with the CDN 110.

The data processing subsystem 230 includes, without limitation, an orchestrator 232, any number of pollers 234, and any number of action generators (AG) 236. The orchestrator 232 manages the operations of the other components included in the data processing subsystem 230. For example, the orchestrator 232 may configure one or more of the pollers 234 to request the system data 220 from the data sources 210. In alternate embodiments, the data sources 210 are configured to periodically transmit the system data 220 to the data processing subsystem 230. In general, the data processing subsystem 230 may receive the system data 220 in any technically feasible fashion via any communication paths and in response to any number and type of active and/or passive events. The AGs 236 compute the actions 240 based on the system data 220 and/or the current states 250 and then transmit the actions 240 to the state processing subsystem 260. Each of the actions 240 reflects an operational status of the CDN 110, and any number of the AGs 236 may be configure to compute any number of the actions 240.

For example, in some embodiments, the state processing subsystem 260 may include a single AG 236. For each of the servers 152, the AG 236 may be configured to compute the action 240 associated with the server 152 based on the CPU metrics and the disk metrics associated with the server 154 and included in the system data 220. Further, the AG 236 may be configured to compute the action 240 associated with the server cluster 150 based on the current states 250 associated with the servers 152 included in the server cluster 150. The data processing subsystem 230 conveys the actions 240 to the state processing subsystem 260 in any technically feasible fashion. For example, in some embodiments, the AG 236 may perform write operations to specific location in the memory 246 to convey the actions 240 to the state processing subsystem 260. In alternate embodiments, the orchestrator 232 may transmit the actions 240 to the state processing subsystem 260 via any communication mechanism and protocol.

As shown, the state processing subsystem 260 includes, without limitation, any number of finite state machines (FSM) 270. In general, each of the FSMs 270 is a computational model that is implemented in software, hardware, or any combination thereof, in any technically feasible fashion. For example, in some embodiments, each of the FSMs 270 may be included in a software application that is stored in the memory 146 of the computing machine instance 140 and executes on the CPU 142. At any given time, each of the FSMs 270 is considered to be in the current state 250 of the FSM 270. The current state 250 of a particular FSM 270 is one of any number of states that is associated with the FSM 270. For example, if a particular FSM 270 is associated with the three states "OK," "broken," and "degraded," then at any given time the current state 250 of the FSM 270 is one of "OK," "broken," or "degraded."

In operation, the FSM 270 receives the action 240 associated with the FSM 270 and computes a next state based on the action 240 and the current state 250 of the FSM 270. If the next state does not equal the current state 250, then the FSM 270 executes a state transition from the current state 250 to the next state, and the next state becomes the current state 250 of the FSM 270. As part of executing a state transition, the FSM 270 also generates an event 380 that corresponds to the state transition. By contrast, if the next state equals the current state, then the FSM 270 does not execute a state transition and does not generate the event 380. The process of computing new states and performing a state transition based on whether the new state is different than the current state 250 is referred to herein as "selectively executing state transitions."

Upon receiving the actions 240 from the data processing subsystem 230, the FSMs 270 selectively execute state transitions. The state processing subsystem 270 then feedbacks the current states 250 to the data processing subsystem 230 and transmits the events 380 to the event processing subsystem 290. In this fashion, the AGs 236 included in the data processing subsystem 230 and the FSMs included in the state processing subsystem 270 collaborate to generate the events 380.

The event processing subsystem 290 includes, without limitation, any number of event handlers 292. Upon receiving a particular event 280, the event handler 292 associated with the event 280 responds to the event 280 based on rules 294 that are implemented in the event handler 292. The rules 294 may be specified in any technically feasible fashion (e.g., software code, configuration files, etc.) and may cause the event processing subsystem 290 to perform any type of monitoring and/or management functionality. In general, the event processing subsystem 290 may be configured to respond to the events 280 in any technically feasibly fashion that either indirectly or directly improves the efficiency of the CDN 110.

For example, in some embodiments, upon receiving the event 280 that reflects the operation of the server cluster 150(1), the corresponding event handler 292 may configure the CDN monitoring subsystem 170 to update a graphical user interface with the status of the server cluster 150(1) based on the rules 294. In other embodiments, upon receiving the event 280 that reflects the operation of the server cluster 150(1), the corresponding event handler 292 may configure the control servers 160 included in the CDN 110 to discontinue routing requests to the server cluster 150(1).

Managing the Content Delivery Network (CDN)

Figure 3:
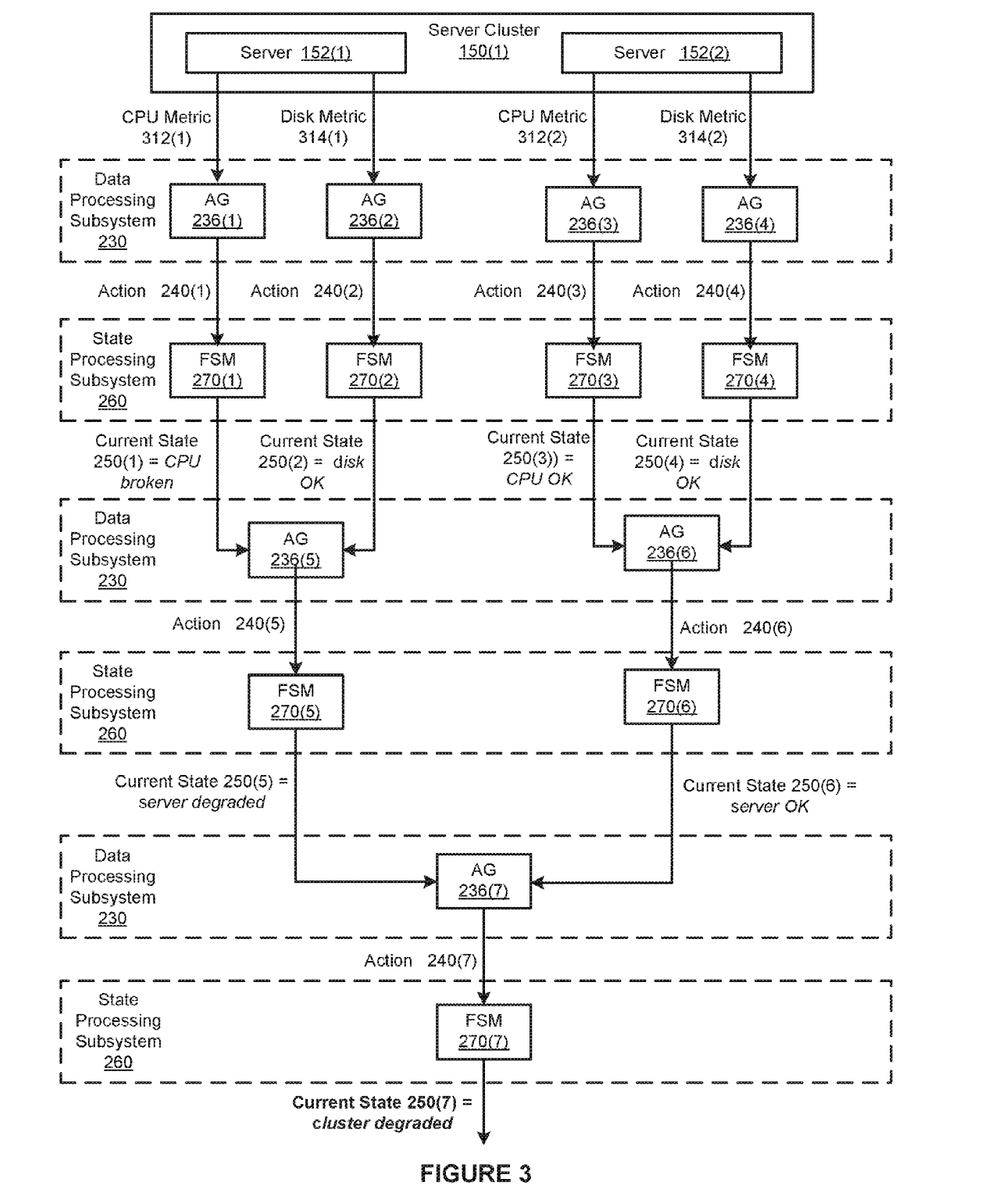
FIG. 3 illustrates how the content delivery network (CDN) monitoring system of FIG. 2 monitors a server cluster, according to various embodiments of the present invention.

FIG. 3 illustrates how the content delivery network (CDN) monitoring system 170 of FIG. 2 monitors the server cluster 150(1), according to various embodiments of the present invention. For explanatory purposes, the server cluster 150(1) includes the servers 152(1) and 152(2). In alternate embodiments, the CDN 110 may include any number of servers 152 distributed between any number of server clusters 150. In yet other embodiments, the CDN 110 may be associated with any type of objects arranged in any technically feasible fashion. Further, the CDN monitoring system 170 may be configured to assess the operation of any number of these objects based on any number of the current states 150 and any type of the system data 220.

The server 152(1) is associated with the system data 220 that includes, without limitation, a CPU metric 312(1) and a disk metric 314(1). Similarly, the server 152(2) is associated with the system data 220 that includes, without limitation, a CPU metric 312(2) and a disk metric 314(2). The CPU metrics 312(1:2) reflect the operation of the CPUs 142 included in the computing machine instances 140 that are configured as the servers 152(1:2). The disk metrics 314(1:2) reflect the operation of disks managed by the servers 152(1:2). In alternate embodiments, the system data 220 may include any number and type of data that reflects the operation of any number of objects associated with the CDN 110.

Among other things, the data processing subsystem 230 includes, without limitation, the AGs 236(1:4). The AG 236(1) computes the action 240(1) based on the CPU metric 312(1), the AG 236(2) computes the action 240(2) based on the disk metric 314(1), the AG 236(3) computes the action 240(3) based on the CPU metric 312(2), and the AG 236(4) computes the action 240(4) based on the disk metric 314(2). In alternate embodiments, any number of the AGs 236 may be configured to compute any number of the actions 240 based on the system data 220 and the current states 250 in any combination. For example, in some embodiments, a single AG 236 may be configured to compute one action 240 based on the CPU metric 312(1) and the disk metric 314(1) and another action 240 based on the CPU metric 312(2) and the disk metric 314(2).

The state processing subsystem 260 includes, without limitation and among other things, the FSMs 270(1:4) that selectively execute state transitions based on the actions(1:4). More specifically, the FSM 270(1) selectively executes state transitions based on the current state 250(1) of the FSM 270(1) and the action 240(1) that is associated with the CPU metric 312(1). The FSM 270(2) selectively executes state transitions based on the current state 250(2) of the FSM 270(2) and the action 240(2) that is associated with the disk metric 314(1). The FSM 270(3) selectively executes state transitions based on the current state 250(3) of the FSM 270(3) and the action 240(3) that is associated with the CPU metric 312(2). The FSM 270(4) selectively executes state transitions based on the current state 250(4) of the FSM 270(4) and the action 240(4) that is associated with the disk metric 314(2).

For explanatory purposes, the current state 250(1) of the FSM 270(1) is depicted as "CPU broken," reflecting that the CPU metric 312(1) indicates that the CPU 142 included in the server 152(1) is not operating as expected. By contrast, the current state 250(2) of the FSM 270(2) is depicted as "disk OK," reflecting that the disk metric 314(1) indicates that a disk managed by the server 152(1) is operating as expected. In a similar fashion, the current state 250(3) indicates that the CPU 142 included in the server 152(1) is operating as expected, and the current state 250(4) indicates that the disk managed by the server 152(2) is operating as expected.

As part of executing a state transition, the current state of the FSM 270 changes. For example, after the FSM 270(1) executes a state transition from the current state 250 "CPU broken" to a new state "CPU OK," the current state 250 of the FSM 270 is "CPU OK." Further, although not shown in FIG. 3, as part of executing a state transition, the FSM 270 transmits a corresponding event 280 to the event processing subsystem 290. The FSM 270 may be implemented in any technically feasible fashion in software, hardware, or any combination thereof. Further, the FSM 270 may execute state transitions in any technically feasible fashion and based on any combination of actions 240, the current state 250, and any other type of information that the FSM 270 is configured to process.

As described previously herein, the state processing subsystem 260 feedbacks the current states 250 to the data processing subsystem 230. In particular, as shown, the state processing subsystem 260 feedbacks the current state 250(1) "CPU broken," the current state 250(2) "disk OK," the current state 250(3) "CPU OK," and the current state 250(4) "disk OK" to the data processing subsystem 230. As also shown, the AG 236(5) included in the data processing subsystem 230 aggregates the current state 250(1) and the current state 250(2) to generate the action 240(5) that reflects the operation of the server 152(1). Similarly, the AG 236(6) included in the data processing subsystem 230 aggregates the current state 250(3) and the current state 250(4) to generate the action 240(6) that reflects the operation of the server 152(2). The AGs 236 may compute the actions 240 in any technically feasible fashion. For example, based on the current state 250(1) "CPU broken" and the current state 250(2) "disk OK," the AG 236(5) may generate the action 240(5) "some server components broken."

The FSM 270(5) included in the state processing subsystem 260 selectively executes state transitions that change the current state 270(5) based on the action 240(5) and the current server state 250(5). Similarly, the FSM 270(6) included in the state processing subsystem 260 selectively executes state transitions that change the current state 270(6) based on the action 240(6) and the current state 270(6). As shown, after processing the actions 240(5) and the actions 240(6), the state processing subsystem 260 feedbacks the current state 250(5) "server degraded" that reflects the operation of the server 152(1) to the data processing subsystem 230. In a similar fashion, the state processing subsystem 260 feedbacks the current state 250(6) "server OK" that reflects the operation of the server 152(2) to the data processing subsystem 230. As a general matter, the current states 270(5:6) are dynamically updated outputs of the state processing subsystem 260 and dynamically updated inputs to the data processing subsystem 230.

Subsequently, the AG 236(7) included in the data processing subsystem 230 aggregates the current state 250(5) and the current state 250(6) to generate the action 240(7) that reflects the operation of the server cluster 150(1). The AG 236(7) may compute the action 240(7) in any technically feasible fashion. For example, because the current state 250(5) is "server broken" and the current state 250(6) is "server OK," the AG 236(7) may generate the action 240(7) "most servers broken."

Finally, in response to the action 240(7), the FSM 270(7) included in the state processing subsystem 260 selectively executes state transitions that change the current state 250 (7). Accordingly, the current state 250(7) of the FSM 270(7) reflects the operation of the server cluster 150(1) as an aggregation of the operation of the servers 152(1:2) that are included in the server cluster 150(1). For example, because the action 240(7) is "most servers broken," the FSM 270(7) may transition from the current state 250(7) "OK" to the current state 250(7) "broken."

As FIG. 3 illustrates, the FSMs 270 enables the CDN monitoring subsystem 170 to mirror complex interactions between objects included in the CDN 110. Consequently, the CDN monitoring subsystem 170 may accurately track the current states 250 that reflect the operation of different aspects of CDN 110 with respect to the entire CDN 110.

Figure 4:
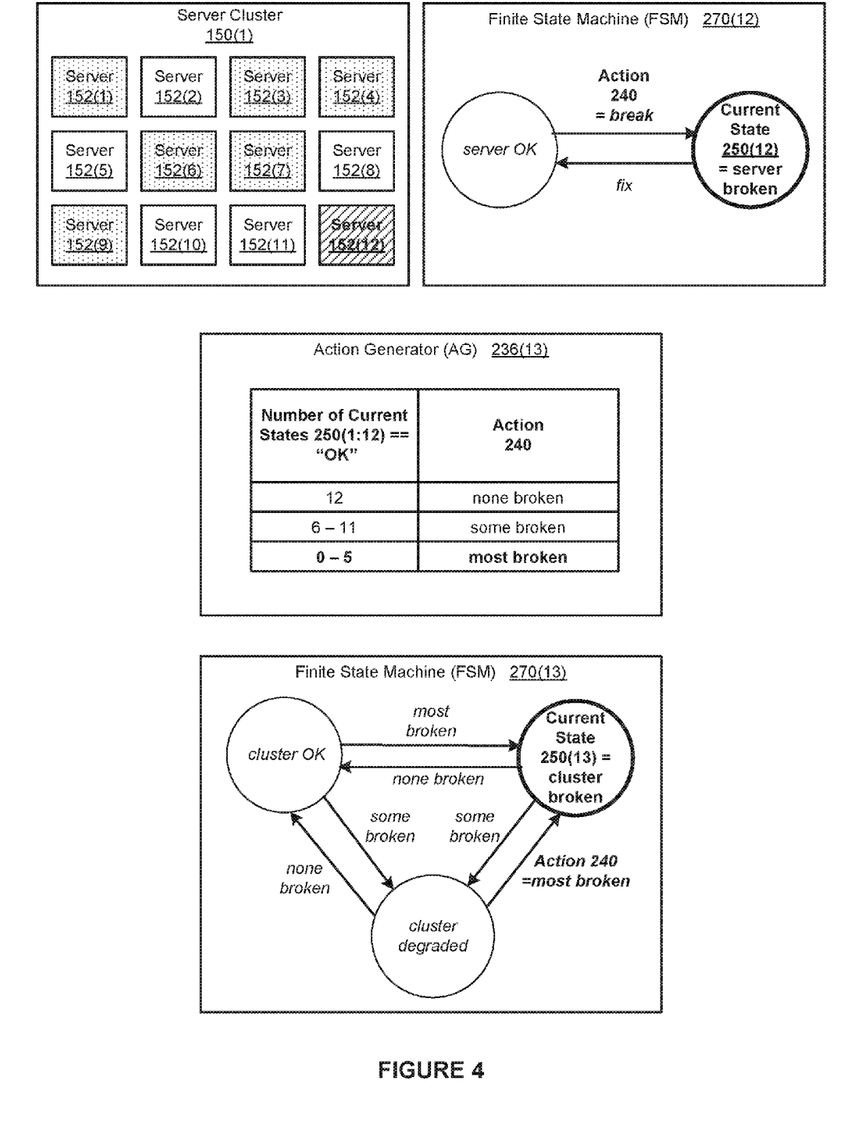
FIG. 4 illustrates how the finite state machines (FSMs) of FIG. 2 monitors a server cluster, according to various embodiments of the present invention.

FIG. 4 illustrates how the finite state machine (FSMs) 270 of FIG. 2 monitors the server cluster 150(1), according to various embodiments of the present invention. For explanatory purposes, the server cluster 150(1) includes the servers 152(1:12). In alternate embodiments, the CDN 110 may include any number of servers 152 organized in any fashion. As depicted by lightly shaded boxes, the six servers 152(1), 152(3), 152(4), 152(6), 152(7), and 152(9) are not functional. By contrast, as depicted by unshaded boxes, the five servers 152(2), 152(5), 152(8), 152(10), and 152(11) are functional. Finally, as depicted by a heavily shaded box, the operational status of server 152(12) changes from functional to not functional. As described previously herein, the data processing subsystem 230 generates the actions 240 associated with the server 152(1) based on the operational status of the server 152(1). In particular, the data processing subsystem 230 generates the action 240 "break" associated with the server 152(1).

The FSM 270(12) is included in the state processing subsystem 260, and the current state 250(12) of the FSM 270 reflects the operational status of the server 152(12). More precisely, the FSM 270(12) selectively executes state transitions based on the current state 250(12) of the FSM 270(12) and the actions 240 associated with the server 152(12). As depicted with a bold state transition arrow and a bold state bubble, upon receiving the action 240 "break," the FSM 270(12) executes a state transition from the current state 250(12) "server OK" to the current state 250(12) "server broken."

The AG 236(13) is included in the data processing subsystem 260 and is associated with the server cluster 150(1). As shown in table form, the AG 236(13) computes the action 240 associated with the server cluster 150(1) based on the current states 250(1:12) associated with the servers 154(1:12). More specifically, if twelve of the current states 250(1:12) equal "OK," then the AG 236(13) computes the action 240 "none broken." If less than twelve but more than seven of the current states 250(1:12) equal "OK," then the AG 236(13) computes the action 240 "some broken." If seven or less of the current states 250(1:12) equal "OK," then the AG 236(13) computes the action 240 "most broken." As depicted in bold, upon receiving the current state 250(12) "server broken," the AG 236(13) determines that five of the current states 250(1:12) equal "server OK," and computes the action 240 "most broken."

The FSM 270(13) is included in the state processing subsystem 260, and the current state 250(13) of the FSM 270(13) reflects the operational status of the server cluster 150(1). As depicted with a bold state transition arrow and a bold state bubble, upon receiving the action 240 "most broken" from the AG 236(13), the FSM 270(13) executes a state transition from the current state 250(13) "cluster degraded" to the current state 250(13) "cluster broken." Notably, because the current states 250(1:12) reflect the operational status of the servers 152(1:12) included in the server cluster 150(1) and the current state 250(13) is an aggregation of the current states 250(1:12), the current state 250(13) accurately reflects the operational status of the server cluster 150(1). In this fashion, the CDN monitoring system 170 indirectly monitors the operational status of the server cluster 150(1) via the operational statuses of the servers 152(1:12).

Figure 5:
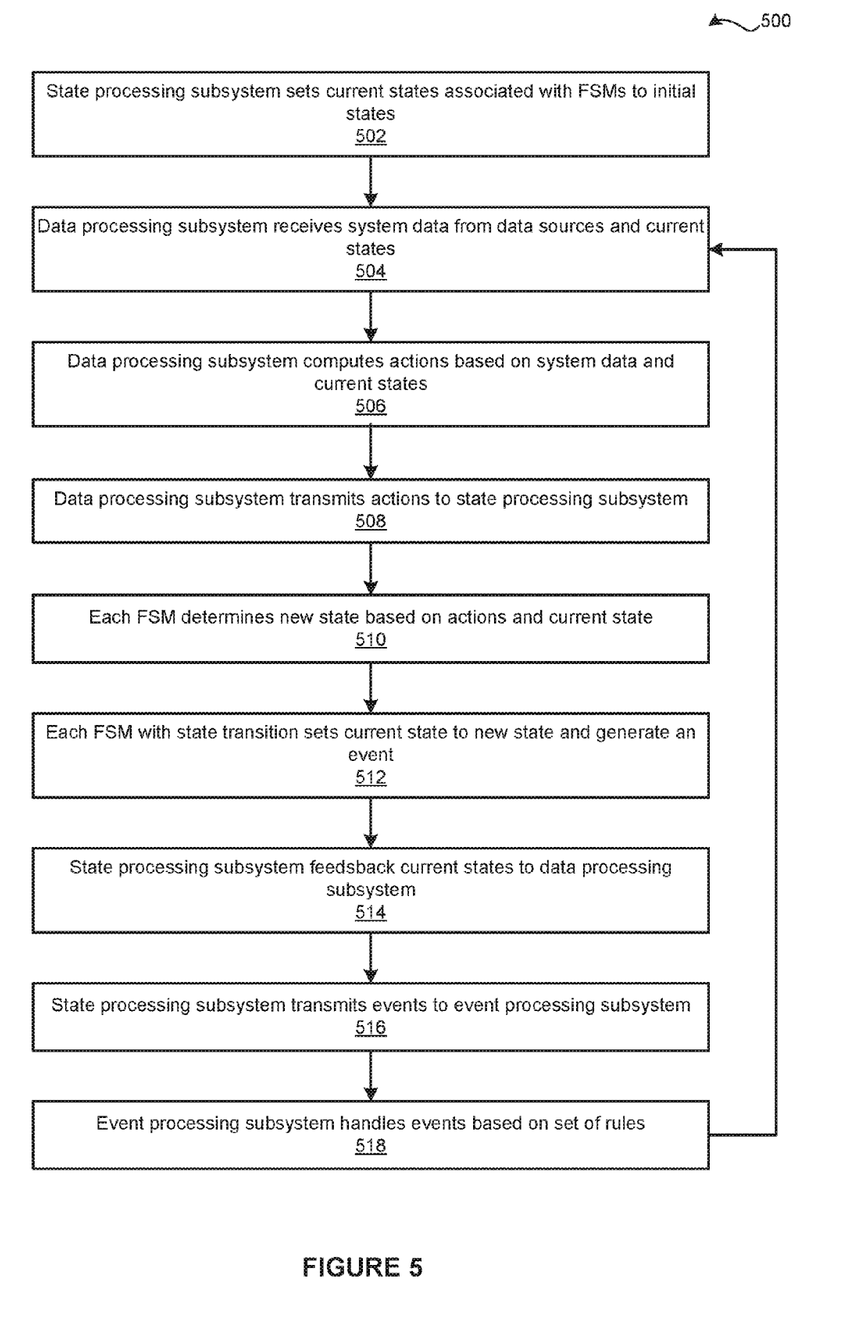
FIG. 5 is a flow diagram of method steps for managing a content delivery network, according to various embodiments of the present invention.

FIG. 5 is a flow diagram of method steps for managing a content delivery network, according to various embodiments of the present invention. Although the method steps are described with reference to the systems of FIGS. 1-4, persons skilled in the art will understand that any system configured to implement the method steps, in any order, falls within the scope of the present invention. Please note that, for purposes of discussion only, it is assumed that the CDN monitoring system 170 is configured to monitor the CDN 110 via the finite state machines (FSMs) 270. At any given point in time, the FSM 270(*i*) is in the current state 250(*i*). In alternate embodiments, the CDN monitoring system 170 may include any type of devices that store any number of current states 250 that are relevant to the operation of any number, combination, and type of machines and/or networks that deliver digital content.

As shown, a method 500 begins at step 502, where the state processing subsystem 260 sets the current states 250 of the finite state machines (FSMs) 270 to initial states. The state processing subsystem 260 may configure the FSMs 270 and determine the initial states in any technically feasible fashion that is consistent with monitoring the operation of the CDN 110. For example, system engineers may configure the CDN monitoring subsystem 170 to implement a set of FSMs 270 that mirrors the deployment of the server clusters 150, the servers 152 included in the server clusters 150, and the networks 214 associated with the CDN 110. Further, the state processing subsystem 260 may determine the initial states based on the configuration 218.

At step 504, the data processing subsystem 230 receives the system data 220 from the data sources 210 and the current states 250 from the state processing subsystem 260. The data processing subsystem 230 may receive the system data 220 via any number and type of communication paths using any combination of communication protocols. Further the data processing subsystem 230 may receive the system data 220 in response to any number of active or passive events. For example, in some embodiments, the data processing subsystem 230 includes the pollers 234 that request the system data 220 from the data sources 210. In alternate embodiments, the data sources 210 are configured to periodically transmit the system data 220 to the data processing subsystem 230.

The system data 220 and the data sources 210 may include any object that may impact the performance of the CDN 110. For example, the system data 220 may include, without limitation, the CPU metric 312 and the disk metric 314. Among other things, the data sources 210 may include the servers 152, the networks 212, the caches 214, the clients 216, and the configuration 218 associated with the CDN 110.

At step 506, the data processing subsystem 230 computes the actions 240 based on the system data 220 and the current states 250. As part of computing each of the actions 240, the data processing subsystem 230 may aggregate any number of the current states 250. For example, the data processing subsystem 230 may determine the action 240 associated with the server cluster 150 based on the current states 250 associated with the servers 152 included in the server cluster 150. In general, the inputs to the data processing subsystem 230 are the system data 220 and the current states 250, and the outputs to the data processing subsystem 230 are the actions 240. At step 508, the data processing subsystem 230 transmits the actions 240 to the state processing subsystem 260 via any communication mechanism and protocol.

At step 510, each of the FSMs 270 receives the action 240 associated with the FSM 270 and computes a new state based on the action 240 and the current state 250 of the FSM 270. At step 512, for each of the FSMs 270, if the new state differs from the current state 250 of the FSM 270, then the FSM 270 executes a state transition. As part of a state transition, the current state 250 of the FSM 270 changes and the FSM 270 generates the event 280.

At step 514, the state processing subsystem 260 feedbacks the current states 250 to the data processing subsystem 230. In this manner, the state processing subsystem 260 configures the data processing subsystem 230 to compute the "new" actions 240 based on the "new" current states 250. Such a feedback process enables the data processing subsystem 230 to compute actions 240 that reflect aggregations of the current states 250 and/or the system data 220. At step 516, the state processing subsystem 260 transmits the events 280 to the event processing subsystem 290.

At step 518, the event handlers 292 included in the event processing subsystem 290 respond to the events 280 based on the rules 294. The rules 294 may cause the event processing subsystem 290 to perform any type of management functionality. For example, in some embodiments, the event processing subsystem 290 may update a graphical user interface with the status of each of the server clusters 150 based on the rules 294. In other embodiments, the event processing subsystem 290 may configure the control servers 160 included in the CDN 110 to discontinue routing requests to a particular server cluster 150 that is associated with the current status 250 "degraded cluster." In general, the event processing subsystem 290 may be configured to respond to the events 280 in any technically feasibly fashion that either indirectly or directly improves the efficiency of the CDN 110.

In sum, the disclosed techniques may be used to monitor, troubleshoot, and maintain content delivery networks (CDN). Notably, a CDN monitoring system is configured to compute current states that are relevant to the operation of the CDN. Further, the CDN monitoring system may be configured to compute new current states based on the any number of current states. In operation, a data processing subsystem receives system data from data sources and current states from a state processing subsystem via a feedback loop. Action generators (AGs) included in the data processing subsystem operate on the system data and current states and generate actions that reflect changes in the operation of the CDN.

Finite state machines (FSM) included in the state processing subsystem execute state transition from current states to new states based on the actions and the current states. The data processing subsystem feedbacks the new states, now the current states, to the data processing subsystem. In this fashion, the data processing subsystem configures the state processing subsystem via actions and the state processing subsystem configures the data processing subsystem via current states. Further, for each transition, the associated FSM generates an event, and transmits the event to an event processing subsystem. Event handlers in the event processing subsystem process the events based on a set of rules. The event handlers may implement any type of management functionality. For example, some event handlers may provide performance metrics to a graphical user interface. Other event handlers may initiate automated debugging, test, or repair procedures.

Advantageously, the state processing subsystem enables the CDN monitoring system to interpret the operation of the CDN in a holistic manner. Consequently the CDN monitoring system may effectively mitigate any issues that reduce the performance of the CDN, jeopardize the availability of content assets stored in the CDN, and/or negatively impact the overall quality of experience provided to clients. In particular, because each current state may depend on other current states, the CDN monitoring system may be configured to monitor a hierarchy of current states that reflects the deployment of the CDN. For example, the data processing subsystem may compute events associated with a current state of a particular server cluster based on the current states of servers that are included in the server cluster. Consequently, unlike conventional approaches to CDN management that rely primarily on metrics associated with individual components, the CDN monitoring system may be configured to perform contextually-relevant operations based on the health of the CDN at any granularity.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method, comprising:
   computing a first action based on a first value of a first metric associated with a component of a content delivery network and a first state that is associated with a first finite state machine (FSM), wherein the first state corresponds to a previously received value of the first metric;
   executing a first state transition between a second state and a third state based on the first action, wherein the second state and the third state are associated with a second FSM associated with a plurality of components in the CDN; and
   in response to the first state transition, executing a first event handling operation to optimize one or more operations of the CDN.

2. The method of claim 1, wherein the first FSM is associated with an operational status of a first server, and the second FSM is associated with an operational status of a first server cluster that includes the first server.

3. The method of claim 2, wherein a third FSM is associated with an operational status of a second server that is included in the first server cluster, and further comprising:
   aggregating the third state and a fourth state that is associated with the third FSM to generate a second action;
   executing a second state transition between the third state and a fifth state that is associated with the second FSM based on the second action; and
   in response to the second state transition, executing a second event handling operation.

4. The method of claim 2, wherein the first state is associated with a degraded sever and computing the first action comprises:
   determining that a number of degraded servers included in a first server cluster is greater than a predetermined threshold; and
   in response, generating a first action that indicates the existence of a degraded server cluster.

5. The method of claim 1 wherein the first metric comprises a disk performance measurement, a processor performance measurement, a network performance measurement, or a configuration parameter.

6. The method of claim 1, further comprising receiving the first metric from a client machine, a network, a cache, or a server machine.

7. The method of claim 1, wherein executing the first event handling operation comprises applying a set of rules that configure a control server associated with the CDN to adjust a distribution of client requests among different server clusters included in the CDN.

8. The method of claim 1, further comprising performing one or more polling operations to obtain the first metric from a client machine, a network, a cache, or a server machine.

9. A non-transitory computer-readable storage medium including instructions that, when executed by a processor, cause the processor to perform the steps of:
   computing a first action based on a first value of a first metric associated with a component of a content delivery network, a first current state that is associated with a first finite state machine (FSM), and a second current state that is associated with a second FSM, wherein the first FSM is associated with a first operational status of the component of the CDN and the second FSM is associated with a second operational status of the CDN, and wherein the first current state corresponds to a previously received value of the first metric;
   computing a next state based on the first action and a third current state that is associated with a third FSM associated with a plurality of components in the CDN;
   determining that the next state does not equal the third current state; and
   setting the third current state equal to the next state and executing a first event handling operation to optimize one or more operations of the CDN.

10. The computer-readable storage medium of claim 9, wherein the first operational status corresponds to a first metric associated with an internet service provider (ISP) network.

11. The computer-readable storage medium of claim 9, wherein the first operational status corresponds to a first metric associated with a first server, the second operational status corresponds to a second metric associated with a second server, and the third FSM is associated with a third operational status of a server cluster that includes the first server and the second server.

12. The computer-readable storage medium of claim 9, wherein the first current state is associated with a degraded sever and computing the first action comprises:
   determining that a number of degraded servers included in a first server cluster is greater than a predetermined threshold; and
   in response, generating a first action that indicates the existence of a degraded server cluster.

13. The computer-readable storage medium of claim 9 wherein the first operational status corresponds to a first metric that comprises a disk performance measurement, a processor performance measurement, a network performance measurement, or a configuration parameter.

14. The computer-readable storage medium of claim 13, further comprising receiving the first metric from a client machine, a network, a cache, or a server machine.

15. The computer-readable storage medium of claim 9, wherein executing the first event handling operation comprises transmitting data indicating the third current state to a monitoring machine for display.

16. The computer-readable storage medium of claim 9, wherein executing the first event handling operation comprises adjusting a distribution of client requests among different server clusters included in the CDN.

17. A system comprising:
   a memory storing a monitoring engine; and
   a processor that is coupled to the memory and, when executing the monitoring engine, is configured to:
      monitor a first component associated with a content delivery network (CDN) via a first metric;
      compute a first action based on a current value of the first metric and a first state that is associated with a first finite state machine (FSM), wherein the first state corresponds to a previous value of the first metric;
      execute a first state transition between a first state and a second state based on the first action, wherein the first state and the second state are associated with the first FSM;

compute a second action based on the second state and a third state that is associated with a second FSM associated with a plurality of components in the CDN;

execute a second state transition between a fourth state and a fifth state based on the second action, wherein the fourth state and the fifth state are associated with a third FSM; and in response to the second state transition, execute a first event handling operation to optimize one or more operations of the CDN.

18. The system of claim 17, wherein the first FSM is associated with an operational status of a first server, the second FSM is associated with an operational status of a second server, and the third FSM is associated with an operational status of a first server cluster that includes the first server and the second server.

19. The system of claim 17, wherein the monitoring engine configures the processor to execute the first event handling operation by transmitting data indicating at least one of the second state and the fifth state to a monitoring machine for display.

20. The system of claim 17, wherein the monitoring engine further configure the processor to perform one or more polling operations to obtain the first metric from a client machine, a network, a cache, or a server machine.

* * * * *

UNITED STATES PATENT AND TRADEMARK OFFICE
CERTIFICATE OF CORRECTION

PATENT NO.         : 10,348,589 B2
APPLICATION NO.    : 15/043429
DATED              : July 9, 2019
INVENTOR(S)        : Sergey Fedorov and Stefan Praszalowicz Page 1 of 1

It is certified that error appears in the above-identified patent and that said Letters Patent is hereby corrected as shown below:

On the Title Page (56) References Cited:
Please delete ""This Box Can Hold an Entire Nethix", Gizmodo, http://gizmodo.com/this-box-can-hold-an-entire-netflix-1592590450." and insert --"This Box Can Hold an Entire Netflix", Gizmodo, http://gizmodo.com/this-box-can-hold-an-entire-netflix-1592590450.--.

Signed and Sealed this
Seventeenth Day of September, 2019

Andrei Iancu
*Director of the United States Patent and Trademark Office*